United States Patent
Anderson

[11] Patent Number: 6,078,483
[45] Date of Patent: Jun. 20, 2000

[54] FLEXIBLE CIRCUIT SUPPORT STRUCTURE AND HEAD CARRIER

[75] Inventor: James C. Anderson, Eagle, Id.

[73] Assignee: Hewlett-Packard Co., Palo Alto, Calif.

[21] Appl. No.: 09/079,109

[22] Filed: May 14, 1998

[51] Int. Cl.[7] .................................. G11B 5/55; G11B 5/49
[52] U.S. Cl. ........................................ 360/261.1; 360/260
[58] Field of Search .................................... 360/104–106, 360/97.01–99.12, 260, 261.1

[56] References Cited

U.S. PATENT DOCUMENTS

| | | | |
|---|---|---|---|
| 5,434,732 | 7/1995 | Schwarz et al. | 360/109 |
| 5,448,438 | 9/1995 | Kasetty | 360/106 |
| 5,615,068 | 3/1997 | Matsuda et al. | 360/109 |
| 5,631,788 | 5/1997 | Richards | 360/104 |
| 5,818,667 | 10/1998 | Larson | 360/106 |
| 5,886,858 | 3/1999 | Yanagihara | 360/106 |
| 5,986,854 | 11/1999 | Vollmann | 360/105 |

FOREIGN PATENT DOCUMENTS

| | | |
|---|---|---|
| 0789352 | 8/1997 | European Pat. Off. . |
| 2-278509 | 11/1990 | Japan . |
| 3-250470 | 11/1991 | Japan . |
| 6-338185 | 12/1994 | Japan . |
| 9-063088 | 3/1997 | Japan . |

OTHER PUBLICATIONS

European Search Report, Aug. 30, 1999.

*Primary Examiner*—William Klimowicz

[57] ABSTRACT

A stiffener attached to the magnetic head or heads in a tape drive to support the flexible circuit and provide a flat surface against which the flexible circuit rolls when the head moves up and down. The stiffener is, preferably, fastened to a head carrier that is attached directly to the magnetic head. This head sub-assembly is mounted to the movable carriage that carries the head up and down at the urging of the head positioning actuator.

8 Claims, 5 Drawing Sheets

FLEXIBLE CIRCUIT SUPPORT STRUCTURE AND HEAD CARRIER

FIELD OF THE INVENTION

The present invention relates generally to tape drives, and more particularly to a support structure for a flexible circuit in a tape drive and a head carrier for the magnetic head of the tape drive.

BACKGROUND OF THE INVENTION

Information is recorded on and read from a moving magnetic tape with a magnetic read/write head positioned next to the tape. The magnetic "head" may be a single head or, as is common, a series of read/write head elements stacked individually and/or in pairs within the head unit. Data is recorded in tracks on the tape by moving the tape lengthwise past the head. The head elements are selectively activated by electric currents representing the information to be recorded on the tape. The information is read from the tape by moving the tape longitudinally past the head elements so that magnetic flux patterns on the tape create electric signals in the head elements. These signals represent the information stored on the tape.

Data is recorded on and read from each of the parallel tracks on the tape by positioning the head elements at different locations across the tape. That is, head elements are moved from track to track as necessary to either record or read the desired information. Movement of the magnetic head is controlled by an actuator operatively coupled to some type of servo control circuitry. Tape drive head positioning actuators often include a lead screw driven by a stepper motor, a voice coil motor, or a combination of both. The carriage that supports the head is driven by the actuator along a path perpendicular to the direction that the tape travels. The head elements are positioned as close to the center of a track as possible based upon the servo information recorded on the tape.

Electrical signals are often carried to and from the head through a flexible circuit, such as a ribbon cable. It is not uncommon to have 30 or 40 individual electrical traces connected to each head in a tape drive to make the necessary connections to the multiple read/write head elements. The total width of the flexible circuit for each head, therefore, is on the order of 5–7 mm. This is quite large relative to the overall size of the head. The present invention addresses some of the difficulties associated with attaching this large comparatively fragile flexible circuit to the magnetic head in a tape drive.

SUMMARY OF THE INVENTION

Accordingly, the present invention is directed to a stiffener attached to the magnetic head or heads in a tape drive to support the flexible circuit and provide a flat surface against which the flexible circuit rolls when the head moves up and down. The stiffener is, preferably, fastened to a head carrier that is attached directly to the magnetic head. This head sub-assembly is mounted to the movable carriage that carries the head up and down at the urging of the head positioning actuator.

The magnetic head, head carrier and stiffener is easily installed as a subassembly in new tape drives or as a replacement part in existing tape drives.

Since the flexible circuits are attached securely to the stiffener and the stiffener is attached securely to the head or head carrier, no other mechanism is needed to attach the flexible circuits to the moveable head carriage or to the actuator. The flexible circuits are well supported by the stiffener during handling and installation. For tape drives that have multiple heads and multiple flexible circuits, the flexible circuits are tied together by the stiffener to make the head, carrier and stiffener sub-assembly more rigid and durable.

DETAILED DESCRIPTION OF THE INVENTION

Figure 1:
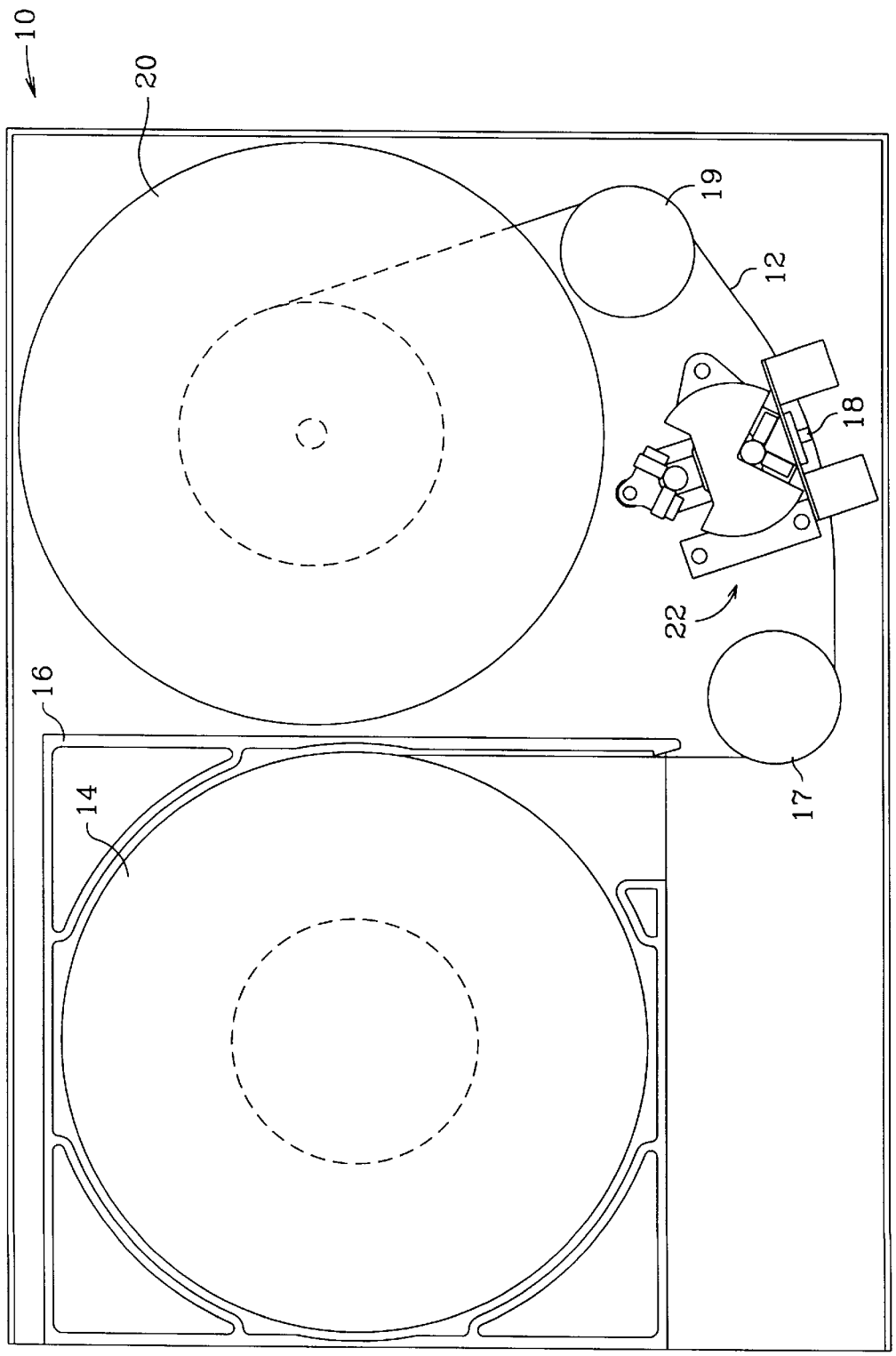
FIG. 1 is a top down plan view of a tape drive incorporating one embodiment of the stiffener and head carrier of the present invention.
Figure 2:
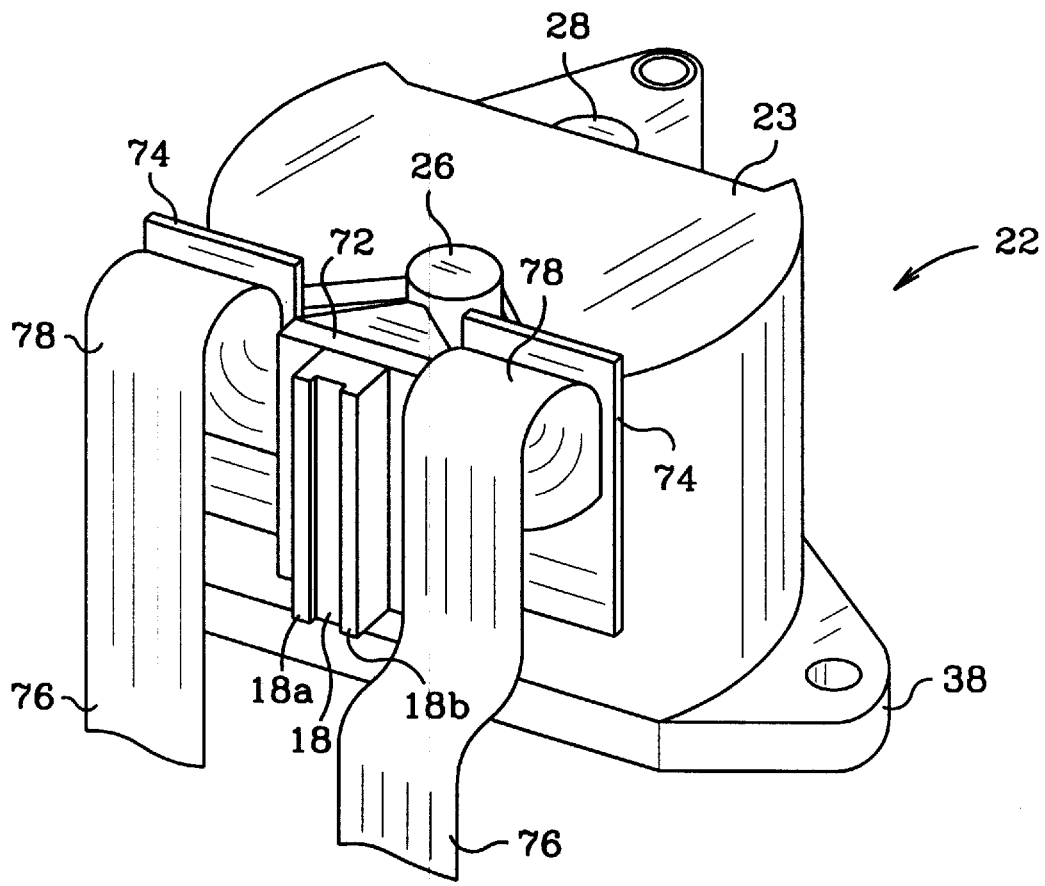
FIG. 2 is a perspective view of the moveable carriage and head positioning actuator of FIG. 1 showing in more detail the stiffener and head carrier.
Figure 5:
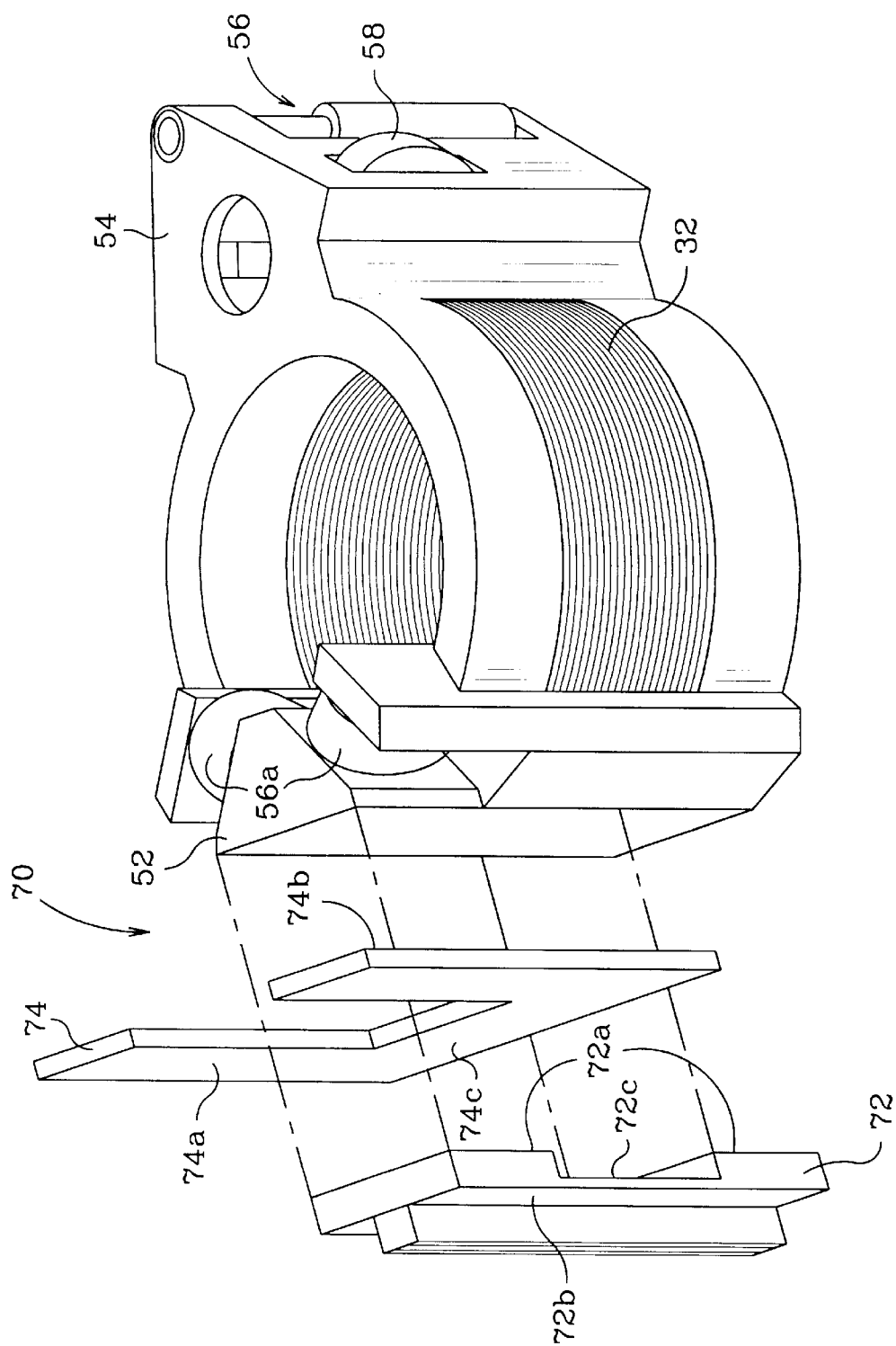
FIG. 5 is a detail perspective exploded view of the head, head carrier, stiffener and carriage.

Referring first to FIG. 1, a magnetic tape 12 is wound on a single supply spool 14 and tape cartridge 16. Tape cartridge 16 is inserted into tape drive 10 for read and write operations. Tape 12 passes around tape guide 17, over a magnetic read/write head 18, around tape guide 19 to take up spool 20. Head 18 is part of a head carriage and actuator assembly 22 that includes a variety of operational features related to head 18. Magnetic head 18 engages tape 12 as tape 12 moves across the face of head 18 to record data on tape 12 and to read data from tape 12. As shown in FIGS. 2 and 5, head 18 may include one or two head "bumps" 18A and 18B positioned closely adjacent to one another. Each bump 18A and 18B is itself an individual head that is capable of recording to and reading information from tape 12. As the first head bump records or "writes" data on the tape, the second head bump reads the data to detect any errors in the recorded data. Each of these read/write head bumps 18A and 18B may include just a single read/write element or each might included a series of read/write elements stacked vertically to enable head 18 to read from or write to several tracks at the same time.

FIG. 2 is a perspective view of the moveable carriage and head positioning actuator of FIG. 1 showing the head sub-assembly 70 and the carriage and actuator assembly 22 in more detail. Referring to FIG. 2, head sub-assembly 70 includes head 18, head carrier 72 and flex circuit stiffeners 74. Flexible circuits 76 electrically connect head 18 with a printed circuit control board (not shown). Flexible circuits 76 provide the communication path for data and servo information to head 18. Flexible circuits 76 are glued or otherwise affixed to stiffener 74. Magnet housing 23 is supported by actuator base 38.

Figure 3:
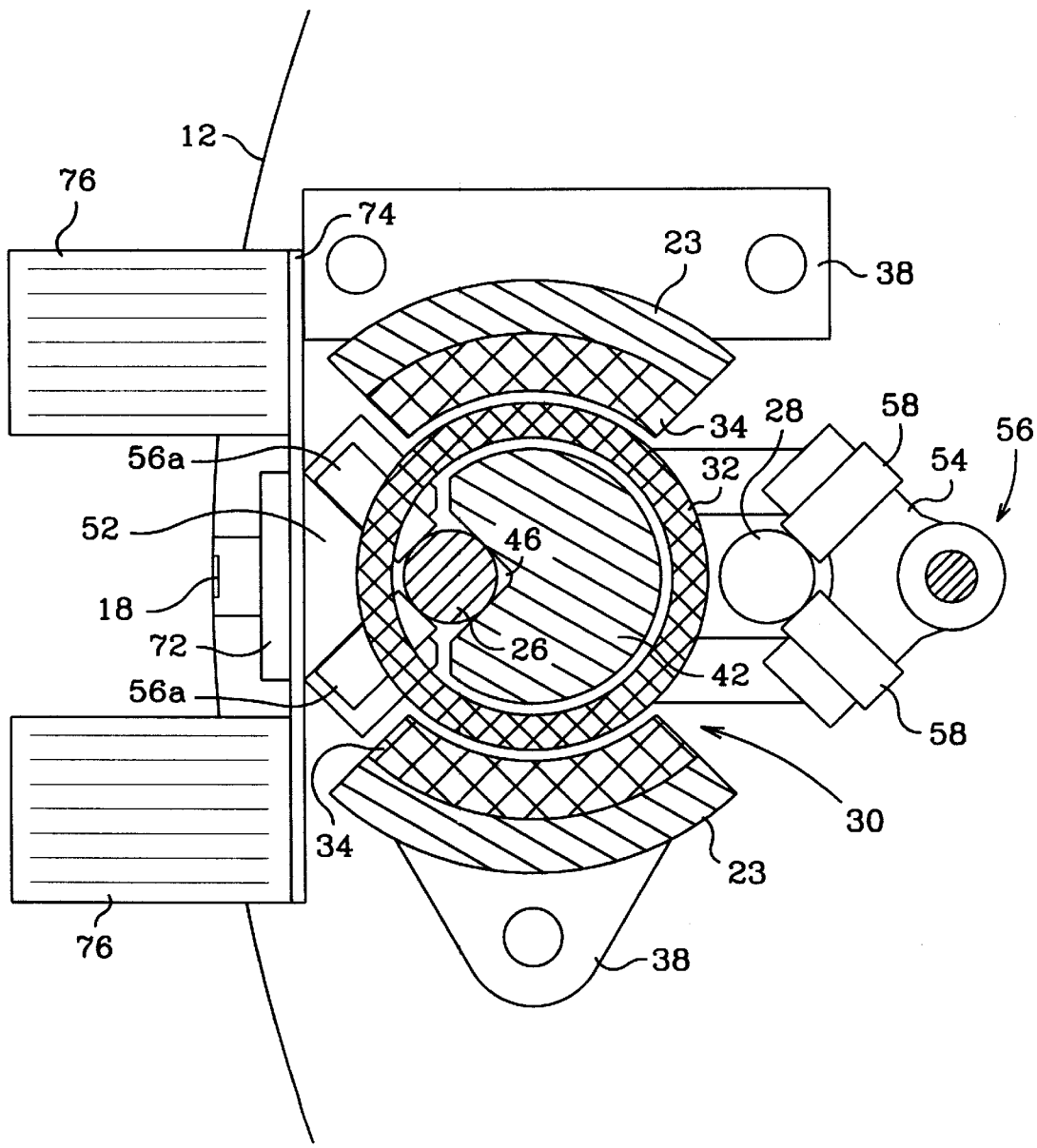
FIG. 3 is a top down plan and partial section view of the moveable carriage and head positioning actuator of FIGS. 1 and 2.
Figure 4:
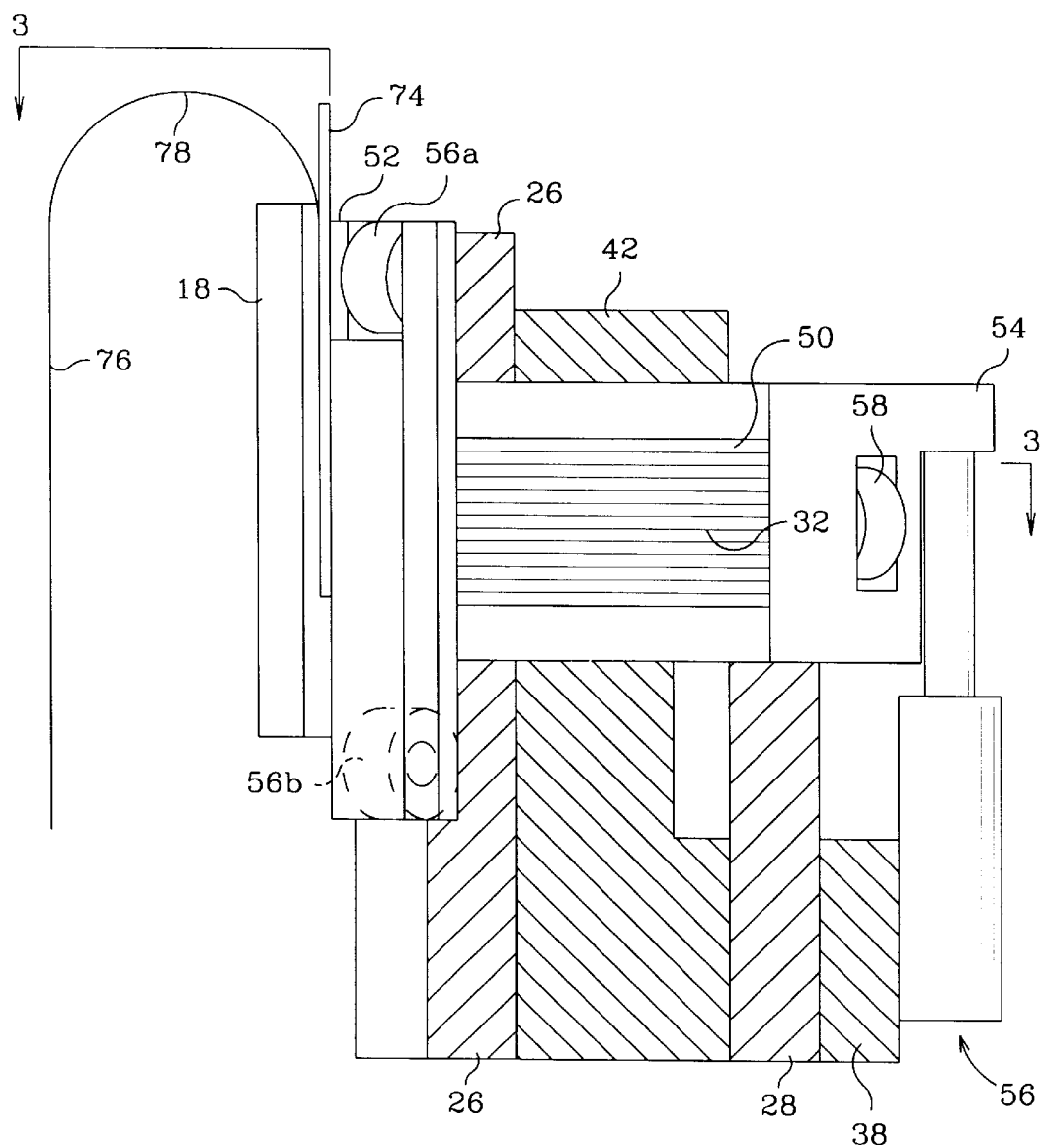
FIG. 4 is a side elevation and partial section view of the moveable carriage and head positioning actuator of FIGS. 1 and 2.

Referring now to FIGS. 3 and 4, head 18 is carried by a moveable carriage 24. Carriage 24 moves up and down along a primary guide rail 26 and a secondary guide rail 28 at the urging of voice coil motor 30. Head 18, which is carried by carriage 24, therefore, also moves up and down in a direction perpendicular to the direction of tape travel as desired to properly position the head elements for reading and writing operations. Voice coil motor 30 includes a coil 32 and magnets 34. Coil 32 is attached to carriage 24. Magnets 34 are attached to the inside of magnet housing 23. Magnet housing 23 carries the magnetic flux of magnets 34 around coil 32 in voice coil motor 30. Magnet housing 23 is supported by actuator base 38 and actuator base 38 is secured to the frame of tape drive 10. (Magnet housing 23 is omitted from FIG. 4 to better illustrate the operative components of actuator assembly 22.)

A core portion 42 of actuator base 38 extends vertically up through coil 32. Primary guide rail 26 extends up along a V-shaped trough 46 formed in the front side 48 of core 42. Secondary guide rail 28 extends up between carriage brackets 50 behind coil 32. Cavities 50 in carriage 24 extend horizontally between a front piece 52 and a back piece 54 on both sides of carriage 24. Head 18 is mounted to front piece 52 of carriage 24. A position sensor 56 that reads the vertical position of carriage 24 is mounted between back piece 54 and actuator base 38. Carriage 24 travels along primary guide rail 26 on two pairs of bearings 56A and 56B mounted in the front piece 52 of carriage 24. Carriage 24 travels along secondary guide rail 28 on one pair of bearings 58 mounted in the back piece 54 of carriage 24.

In operation, actuator 22 positions head 18 relative to tape 12 according to positional information recorded on tape 1 2. A servo control signal is generated from the positional information on tape 12 through servo control circuitry (not shown) and delivered as an electrical current to voice coil 32. The presence of the current carrying wires in coil 32 in the magnetic field of magnets 34 creates a vertical force on coil 32 and, correspondingly, on carriage 24. This vertical force moves carriage 24 and head 18 up or down as necessary to properly position head 18 relative to tape 12.

Referring now also to FIG. 5, the head sub-assembly 70 includes head 1 8 secured to a front face 72A of head carrier 72 with glue or another suitable fastening mechanism. Head sub-assembly 70 is securely attached to carriage 24 at the rear face 72B of carrier 72. Although any suitable fastener may be used to attach head sub-assembly 70 to carriage 24, including screws, clips or even an adhesive, head sub-assembly 70 must be securely attached to carriage 24 to eliminate any slippage or other relative movement between head 18 and carriage 24.

Flexible circuits 76 electrically connect head 18 with a printed circuit control board (not shown). Flexible circuits 76 provide the communication path for data and servo information to head 18. A stiffener 74 helps support flexible circuits 76. Preferably, stiffener 74 is attached to head carrier 72. Alternatively, stiffener 74 may be attached to carriage 24. In this embodiment, stiffener 74 is a flat U-shaped rigid member characterized by a pair of upright flange portions 74A and 74B and a web portion 74C connecting the flange portions 74A and 74B. Stiffener 74 may be made of plastic or another sufficiently rigid lightweight material. Flexible circuits 76 are glued or otherwise affixed to stiffener 74 near head 18. As best seen in FIGS. 2 and 4, flange portions 74A and 74B extend vertically above head 18 to provide a flat surface for flexible circuits 76 to roll against when carriage 24 and head 18 move up. Web portion 74C of stiffener 74 fits in a recess 72C in the rear face 74B of carrier 74.

Stiffener 74 provides a convenient and durable means to handle head 18 during assembly with the other components of head carriage and actuator assembly 22. Since stiffener 74 is rigidly attached to head carrier 70, it makes a good structure to handle head 18 during assembly and installation. Flexible circuits 76 are oriented to come off stiffener 74 in the correct direction to roll properly for the "dynamic" loop 78 in flexible circuit 74, as best seen in FIG. 4. Since flexible circuits 76 are affixed to stiffener 74 well beyond the area of the connection to head 18, stiffener 74 provides good protection against flexible circuits 76 pealing up and breaking the stitch bond wires (not shown) connecting head 18 to flexible circuits 76.

Although the invention has been shown and described with reference to the foregoing embodiments, alternative embodiments may be made without departing from the spirit and scope of the invention as defined in following claims.

What is claimed is:

1. A tape drive head assembly, comprising:

a head;

a moveable carriage carrying the head;

a flexible circuit electrically connected to the head;

a stiffener supporting the flexible circuit, the stiffener having a flat rigid portion that extends above the head; the stiffener connected to the carriage for movement therewith, the stiffener disposed in a plane substantially parallel to a transducing surface of said head; and wherein the stiffener is positioned relative to the flexible circuit so that a loop in the flexible circuit rolls against the flat rigid portion of the stiffener when the carriage moves.

2. A tape drive head assembly, comprising:

a moveable carriage;

a head carrier having a front face and an opposing rear face having a recess therein, the head carrier attached at its rear face to the carriage;

a head secured to the front face of the head carrier;

a flexible circuit electrically connected to the head;

a stiffener supporting the flexible circuit, the stiffener connected to the carriage for movement therewith, the stiffener disposed in a plane substantially parallel to a transducing surface of said head, the stiffener comprising a U-shaped rigid member characterized by a pair of upright flange portions joined by a web portion, the flange portions of the stiffener extending above the head and the web portion of the stiffener disposed in the recess in the rear face of the head carrier.

3. A tape drive, comprising:

a head operative to transfer data to and from a tape;

a moveable carriage carrying the head;

an actuator operatively coupled to the carriage, the actuator operative to selectively move the carriage in a direction perpendicular to the direction the tape moves;

a flexible circuit electrically connected to the head; and a stiffener supporting the flexible circuit, the stiffener connected to the carriage for movement therewith, the stiffener disposed in a plane substantially parallel to a transducing surface of said head, the stiffener positioned relative to the flexible circuit so that a loop in the flexible circuit rolls against the stiffener when the carriage moves.

4. The tape drive according to claim 3, wherein a portion of the flexible circuit near the head is secured to the stiffener.

5. The tape drive according to claim 3, further comprising a head carrier disposed between the head and the carriage and the head is attached to the head carrier.

6. The tape drive according to claim 5, wherein the stiffener is attached to the head carrier.

7. A tape drive, comprising:

a head operative to transfer data to and from a tape;

a moveable carriage carrying the head;

an actuator operatively coupled to the carriage, the actuator operative to selectively move the carriage in a direction perpendicular to the direction the tape moves;

a flexible circuit electrically connected to the head; and a stiffener supporting the flexible circuit, the stiffener having a flat rigid portion that extends above the head.

8. A tape drive head assembly, comprising:

a head;

a moveable carriage carrying the head;

a flexible circuit electrically connected to the head;

a stiffener supporting the flexible circuit, the stiffener disposed between the head and the carriage and the stiffener connected to the carriage for movement therewith; the stiffener disposed in a plane substantially parallel to a transducing surface of said head; and wherein the stiffener is positioned relative to the flexible circuit so that a loop in the flexible circuit rolls against the stiffener when the carriage moves.

* * * * *